(12) United States Patent
Santucci

(10) Patent No.: US 10,800,473 B2
(45) Date of Patent: Oct. 13, 2020

(54) STORAGE CONTAINER OF A MOTORCYCLE PROVIDED WITH AN OBJECT BLOCKING SYSTEM

(71) Applicant: PIAGGIO & C. S.P.A., Pontedera, Pisa (IT)

(72) Inventor: Mario Donato Santucci, Pisa (IT)

(73) Assignee: PIAGGIO & C. S.P.A., Pontedera, Pisa (IT)

( * ) Notice: Subject to any disclaimer, the term of this patent is extended or adjusted under 35 U.S.C. 154(b) by 0 days.

(21) Appl. No.: 16/482,209

(22) PCT Filed: Jan. 26, 2018

(86) PCT No.: PCT/IB2018/050478
§ 371 (c)(1),
(2) Date: Jul. 30, 2019

(87) PCT Pub. No.: WO2018/142249
PCT Pub. Date: Aug. 9, 2018

(65) Prior Publication Data
US 2020/0223505 A1 Jul. 16, 2020

(30) Foreign Application Priority Data
Jan. 31, 2017 (IT) ........................ 102017000010242

(51) Int. Cl.
*B62J 9/26* (2020.01)
(52) U.S. Cl.
CPC ....................................... *B62J 9/26* (2020.02)
(58) Field of Classification Search
CPC ... B65D 81/052; B62J 9/26; B62J 9/00; B62J 9/20; B62J 9/40; B62J 11/22
(Continued)

(56) References Cited

U.S. PATENT DOCUMENTS 5,624,035 A * 4/1997 Kim .................... B65D 81/052
206/521
6,116,064 A * 9/2000 Driscoll .................... B62J 9/26
70/59

(Continued)

FOREIGN PATENT DOCUMENTS

| CN | 105253222 A | 1/2016 |
| JP | S60-18469 A | 1/1985 |

OTHER PUBLICATIONS

International Search Report and Written Opinion of the International Searching Authority for International Patent Application No. PCT/IB2018/050478 dated Apr. 24, 2018, 9 pages.

*Primary Examiner* — Corey N Skurdal
(74) *Attorney, Agent, or Firm* — Merchant & Gould P.C.

(57) ABSTRACT

A storage container of a motorcycle includes a container body defining a storage compartment and a lid functionally connected to the container body. The container body includes an access opening, a bottom wall opposite to the access opening and a side wall extending perimetrally and joined to the bottom wall. The lid connects to the container body to take an open configuration allowing access to the storage compartment by the access opening, and a closed configuration preventing the storage compartment from being accessed. The storage container includes an object blocking system associated with the container body or with the lid adapted to block an object housed in the storage compartment. The object blocking system includes an inflatable member adapted to be operatively received in the storage compartment and which is adapted to have a resting configuration, in which the inflatable member is substantially deflated.

8 Claims, 1 Drawing Sheet

(58) Field of Classification Search
USPC .......................................................... 206/522
See application file for complete search history.

(56) References Cited

U.S. PATENT DOCUMENTS

| | | | |
|---|---|---|---|
| 2003/0062286 A1* | 4/2003 | Igarashi | B65D 81/052 |
| | | | 206/522 |
| 2017/0210539 A1* | 7/2017 | Smith | B65D 81/052 |
| 2017/0320650 A1* | 11/2017 | Aguilar | B65D 81/052 |

* cited by examiner

STORAGE CONTAINER OF A MOTORCYCLE PROVIDED WITH AN OBJECT BLOCKING SYSTEM This application is a National Stage Application of PCT/IB2018/050478, filed 26 Jan. 2018, which claims benefit of Ser. No. 102017000010242, filed 31 Jan. 2017 in Italy and which applications are incorporated herein by reference. To the extent appropriate, a claim of priority is made to each of the above-disclosed applications.

BACKGROUND OF THE INVENTION

The present invention generally relates to the field of motorcycles, and more particularly, to a storage container of a motorcycle.

On some types of motorcycles, particularly but not exclusively on scooters with two or more wheels, the application is known of storage compartments or helmet compartments made both beneath the saddle and in the form of a storage container, such as a top box applied to or integrated into the rear part of the vehicle.

Storage top boxes, commonly fixed to the rear, consist of a container body, which defines the storage compartment, and a lid hinged to the container body so as to take an open configuration allowing access to the storage compartment, and a closed configuration, in which the lid closes the container body at the top, preventing the storage compartment from being accessed.

The container body of the top box is normally a rigid body with a closed bottom, which is adapted to be closed at the top by the lid as described above.

The storage compartment is commonly used for carrying objects, for example a pair of helmets (driver and passenger). One drawback of top boxes of the prior art originates from the fact that, due to their size and encumbrance, the objects carried can move around, even slightly, inside the compartment while the motorcycle is in use. Even though the robustness of the helmets may prevent the helmets themselves from being seriously damaged, knocks or rubbing can damage the paint work or surface finishing, besides making a noise.

Additionally, it must be noted that the storage compartment of the top box may also be used for carrying other objects, also small or fragile, particularly when the motorcycle on which the top box is fitted is moving and the helmet is being worn by the driver.

A further drawback of top boxes of the prior art arises from that, when the storage compartment is used for carrying objects of different sizes, other than a helmet, it is difficult for them to be contained by the walls of the compartment and therefore, after bumps, for example encountered by the motorcycle while moving, they can move around and make a noise, besides banging against the container body or the lid of the top box and thus suffer damaged.

SUMMARY OF THE INVENTION

It is an object of the present description to provide a storage container of a motorcycle, which allows the drawbacks previously described with reference to storage containers according to the prior art, to be at least partially solved or overcome.

BRIEF DESCRIPTION OF THE DRAWINGS

The invention will be better understood from the following detailed description of the embodiments thereof, given by way of non-limiting example, with reference to the accompanying drawings, in which.

DETAILED DESCRIPTION OF THE PREFERRED EMBODIMENTS

Equal or similar elements are indicated in the accompanying drawings by the same numerical references.

It is noted that in the present description, the terms "internal" and "external" refer to the center of the storage compartment of the storage container.

Figure 1:
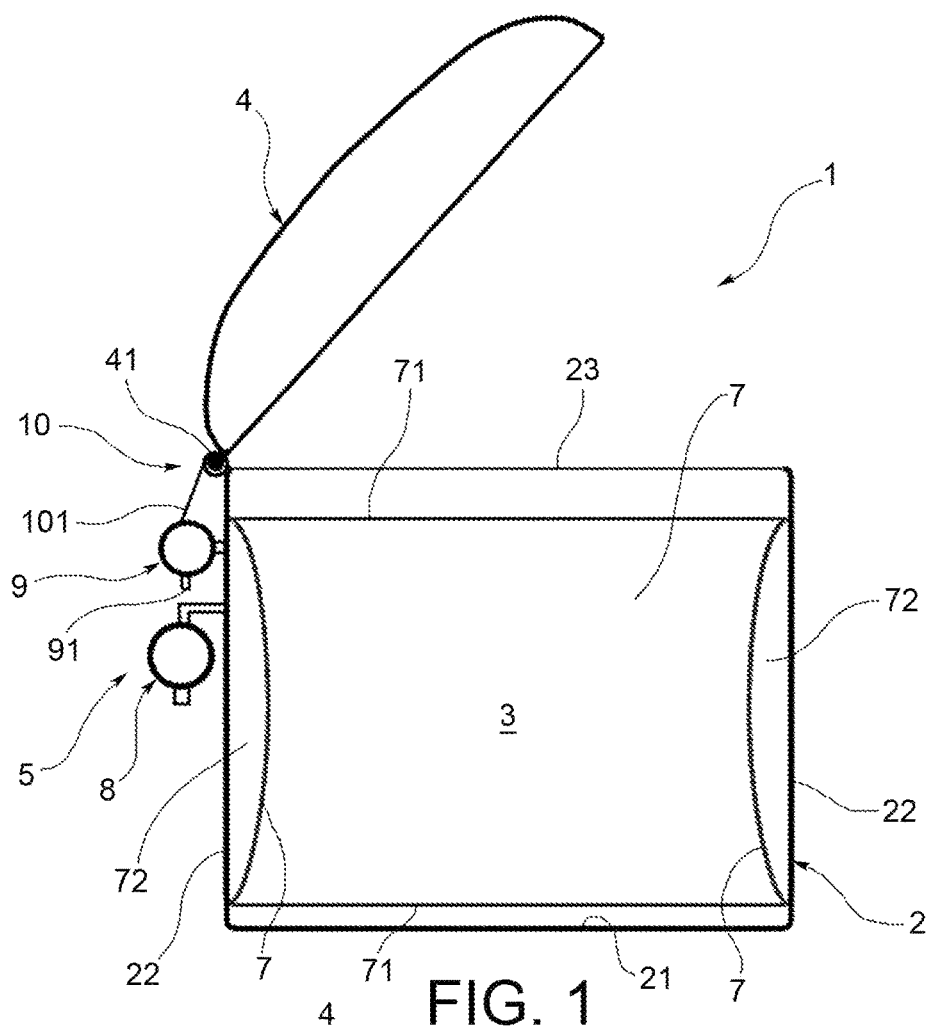
FIG. 1 is a diagrammatic cross-section side view of a top box for motorcycles according to a preferred embodiment, such a top box being depicted with the respective lid in an open configuration and being provided with an object blocking system for blocking an object in the storage compartment of the top box, such an object blocking system being depicted in a respective resting configuration.
Figure 2:
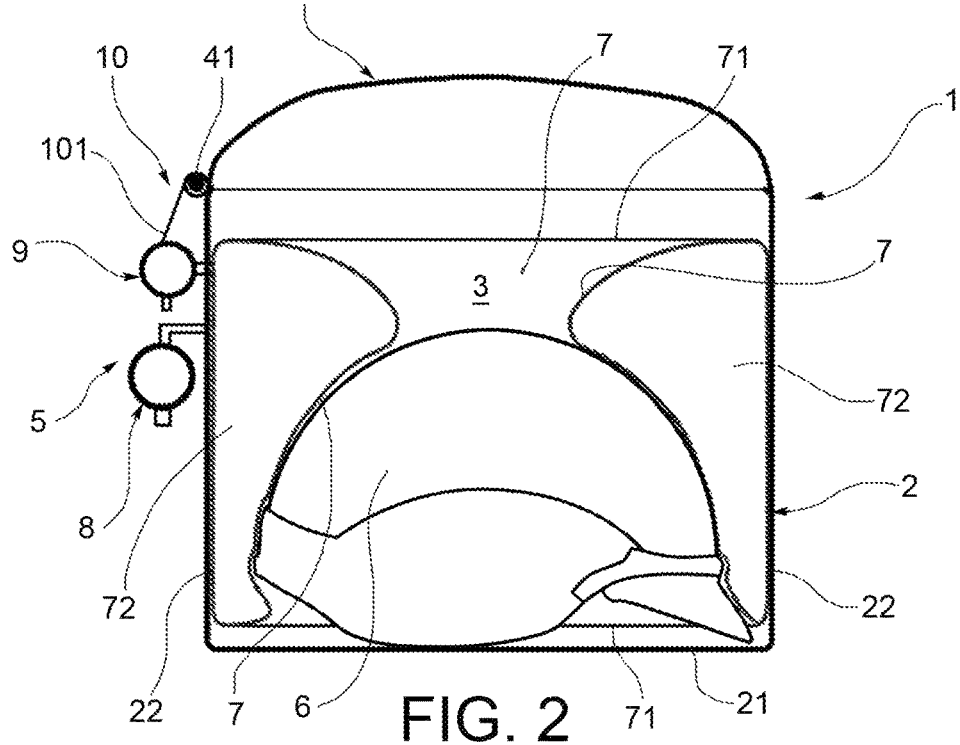
FIG. 2 is a diagrammatic cross-section side view similar to FIG. 1, in which the top box in FIG. 1 is depicted with the lid thereof in a closed configuration and in which the object blocking system in FIG. 1 is depicted in an expanded configuration, in which such a system is adapted to block an object housed in the storage compartment.

With reference to FIG. 1-2, a storage container of a motorcycle is diagrammatically shown according to a preferred embodiment, which has been indicated by reference number 1 as a whole. In the example, the storage container is a top box 1. Note, however, that the information in the present description is not limited to the application to a top box, but can generally apply to other types of storage containers of a motorcycle, such as a saddlebag of a motorcycle, for example a saddlebag of the type adapted to be attached to the side of the motorcycle. In particular, the top box 1—adapted to be applied or integrated into the rear part of the motorcycle—comprises a container body 2 defining an internal storage compartment 3 and a lid 4 operatively connected to the container body 2 so as to take an open configuration (FIG. 1) and a closed configuration (FIG. 2). In practice, the container body 2, known per se, is a body, e.g. a rigid or semi-rigid or flexible body, for example made of rigid plastic, or leather or other similar materials, shaped to accommodate objects therein. In the open configuration, the lid 4 allows access to the storage compartment 3 by means of an access opening 23. In the closed configuration, the lid 4 closes the access opening 23 preventing the compartment 3 from being accessed. The lid 4 is functionally connected to the container body 2. According to a preferred embodiment, in particular, the lid 4 is rotatably hinged to the container 2, preferably by means of a connection hinge 41. According to a preferred embodiment, the container body 2 comprises a bottom wall 21 and a side wall 22, which extends perimetrally and is joined to the bottom wall 21. The bottom wall 21 is opposite the access opening 23 allowing access to the compartment 3 when the lid takes the open configuration.

The storage container 1 comprises an object blocking system 5 for blocking an object 6, such as, for example and without limitation, a helmet 6, which is housed in the storage compartment 3. According to one embodiment, the object blocking system 5 is associated with the container body 2. According to an alternative embodiment (not shown) the object blocking system 5 is associated with the lid 4. Nevertheless, it is noted that the object blocking system 5 can generally be associated with at least one from among the bottom wall 21, the side wall 22 and the lid 4. The object blocking system 5 comprises an inflatable or expandable member 7 adapted to be operatively received in the storage compartment 3. The inflatable member 7 is a blocking member provided for blocking the object 6 housed in the storage compartment 3, as described in detail below. In particular, the inflatable member 7 is adapted to take a resting configuration (FIG. 1) and an expanded configuration (FIG. 2). In the resting configuration, the inflatable member 7 is deflated or substantially deflated. In the expanded configuration, the inflatable member 7 is expanded with respect to the resting configuration. In particular, in the expanded configuration and when the lid 4 takes the closed configuration, the inflatable member 7 extends in the storage compartment 3 and is adapted to block the aforesaid object 6 housed in the compartment 3. According to a preferred embodiment, as shown for example in FIG. 2, in the expanded configuration and when the lid 4 takes the closed configuration, the inflatable member 7 extends in the storage compartment 3 and is adapted to block the object 6 housed in the storage compartment 3 against the bottom wall 21. Note, however, that generally in the expanded configuration and when the lid 4 takes the closed configuration the inflatable member 7 extends in the storage compartment 3 and is adapted to block the object 6 housed in the storage compartment 3 against at least one from among the bottom wall 21, the side wall 22 and the lid 4. For example, and without introducing any limitation, according to an embodiment (not shown) the inflatable member 7 is coupled or attached to the lid 4. In this case, when the inflatable member 7 is in the expanded configuration and when the lid 4 takes the closed configuration, the inflatable member 7 extends in the storage compartment 3 and is adapted to block the object 6 housed in the storage compartment 3 against at least one from among the bottom wall 21 and possibly also the side wall 22. According to an alternative embodiment, the inflatable member 7 is coupled or attached to the bottom wall 21 and in said expanded configuration it is adapted to block the object 6 against at least the lid 4 and possibly also the side wall 22. According to a further embodiment, the inflatable member 7 is coupled or attached to the side wall 22 and in the expanded configuration it is adapted to block the object 6 against at least one from among the bottom wall 21, the side wall 22 and the lid 4.

According to a convenient embodiment, the inflatable member 7 comprises a member 7 with an annular shape, preferably toroidal, arranged in the storage compartment 3 and attached to the container body 2. According to one embodiment, the annular member 7 (depicted in cross-section in FIG. 1-2) is a member essentially shaped as a ring or an annular air chamber preferably adapted to take a toroidal or partially toroidal shape in the expanded configuration. The annular inflatable member 7 comprises a central opening 71 inside which said object 6 is adapted to be received and held in the aforesaid expanded configuration. The toroidal shape presents various advantages: limited encumbrance when the inflatable member is deflated; easy to mount onto the walls of the container body 2 or the lid 4; it doesn't contrast the action of the lid 4; functionally, it is particularly adapted to keep semispherical objects still, such as helmets, holding them along their perimeter and making them integral with the container body 2.

According to a preferred embodiment, a pressure relief valve (not depicted) of the type in itself known can be associated with the inflatable member 7. According to a preferred embodiment, the annular member 7 is arranged with the respective central opening 71 facing the bottom wall 21 of the container body 2. The inflatable member 7 is preferably fixed to at least one of the walls 21 and 22 of the container body 2.

The object blocking system 5 comprises an inflation device 8 operatively connected to the inflatable member 7 to allow the inflatable member 7 to be inflated. According to one embodiment, the inflation device 8 is adapted to introduce air into a space 72 or a cavity 72 of the inflatable member 7. The inflation device 8 is adapted to cause the inflatable member 7 to switch from the resting configuration to the expanded configuration. According to a preferred embodiment, the inflation device 8 comprises an electric pump 8, which is preferably fitted with a non-return valve. The electric pump 8 is preferably arranged integral with the top box and is contained either in a double bottom beneath the same or at the side of the same. The double bottom defines a second space adapted to contain the pump and accessory members, such as tubing and valve. The pump 8 can be controlled by means of control elements provided in the instrument panel of the motorcycle on which the top box 1 is to be installed. In particular, since the top box is fitted with a rapid coupling and uncoupling device, the electrical contacts, which control and supply the pump, are advantageously made in the rapid coupling/uncoupling device. For example, the contacts can be made by means of a jack for manual connection to the vehicle when the top box is installed, or in the form of sliding contacts, which connect automatically when the top box is attached. It is technically noted that the supply voltage is 12V and acts on the contacts only for the actuation time of the pump, thus for a few seconds.

The object blocking system 5 also comprises a release device 9, preferably comprising a release valve 9, which is operatively connected to the inflatable member 7 to allow the inflatable member 7 to be deflated. The release device 9 is adapted to cause the inflatable member 7 to switch from the expanded configuration to the resting configuration.

According to a convenient embodiment, the object blocking system 5 comprises a control system 10 operatively connected to the release device 9 for controlling the release device 9 by means of a movement of the lid 4 from the closed configuration to the open configuration so as to allow the inflatable member 7 to be deflated. Thereby, when the lid 4 is opened, the release device 9 is activated, allowing the inflatable member 7 to be at least partially deflated, so as to take/insert the object from/into the storage compartment. According to a preferred embodiment, the control system can be made, for example and without limitation, by means of a simple mechanical command. For example, the control system 10 can comprise a mechanical connection 101, which is operatively connected to the hinge 41 and the release device 9. In particular, the connection 101 is connected to the hinge 41 and the release device 9 so that when the lid 4 is in the closed configuration, the release device 9 takes a state of closure, in which the mechanical connection 101 closes a release opening 91 of the release device 9 so as to prevent the release of the air, keeping the inflatable member 7 in the expanded configuration. When the top box is opened, i.e. when the lid 4 switches from the closed configuration to the open configuration, the mechanical connection 101, controlled by the hinge 41, allows the release device 9 to take a state of release, in which the mechanical connection 101 frees the release opening 91, thus allowing the release of the air and therefore the deflation of the inflatable member 7. It is noted that when the lid 4 takes the open configuration, the release device 9 remains in the state of release and the inflatable member 7 continues to be deflated preferably until it achieves the resting configuration, in which the air pressure inside the inflatable member 7 preferably reaches the atmospheric pressure. It is also noted that, in the example shown in FIGS. 1-2, the inflatable member 7 cannot be inflated while the lid 4 is in the open configuration. To proceed with inflating the inflatable member 7, the lid 4 must take the closed configuration and the release opening 91 of the release device 9 is closed again by the mechanical connection 101.

After the description of the structure of the storage container 1, an example of operation of the object blocking system 5 will now be given and described with reference to the embodiment shown in figures FIG. 1 and FIG. 2.

Considering the top box 1 with the lid 4 in the closed configuration (FIG. 2) and the inflatable member 7 in the resting configuration (FIG. 1), it is possible to inflate the inflatable member 7 by operating the inflation device 8 until it takes up a considerable part of the storage compartment 3 and, more preferably, the maximum volume possible inside the storage compartment 3, compatibly with the presence of the object 6 (as shown for example in FIG. 2) and any other objects housed inside the compartment 3.

After being inflated, the inflatable member 7 preferably keeps the object 6 and any further objects in contact with the bottom wall 21, preventing it from moving around, knocking and hitting the walls 21, 22 and/or the lid 4.

The relief valve, if provided, lets any excess air out of the space 72, keeping the pressure generated by the inflatable member 7 constant on the objects inside the compartment 3 and holding such objects still.

When the storage container 1 is opened, i.e. when the lid 4 moves from the closed configuration to the open configuration, the release device 9 is activated by the control system 10 and the inflatable member 7 deflates and takes the resting configuration again.

When the storage container 1 is closed again, i.e. when the lid 4 is moved from the open configuration to the closed configuration, the release device 9 closes again, so that the inflation device 8 can be activated to allow the inflatable member 7 to be inflated until it takes the expanded configuration again, in which it allows one or more objects to be held still inside the storage compartment 3.

It is noted that, with the description of the top box 1, a motorcycle comprising the top box 1 was also implicitly described. In this regard, it is noted that the term "motorcycle" shall be generally interpreted to include all motorcycles with two or three wheels, such as, for example and without limitation, mopeds, motorbikes, scooters, etc.

Based on the above, it is therefore possible to understand how a storage container for motorcycles according to the present invention allows the aforesaid objects to be achieved with reference to the known prior art.

It is apparent that modifications and/or variations can be made to the explanation described and shown above by way of example.

For example, it is noted that for the purposes of the present description, the term "inflatable" shall be generally understood to comprise a member generally adapted to expand when it is inflated with a flow of air or another pressurized gas. For example, according to an alternative embodiment, the inflatable member 7 can comprise an elastic membrane (not depicted) attached to the lid 4 and adapted to expand inside the compartment 3 of the top box. In particular, such an elastic membrane is attached to the lid 4 so as to ensure the sealing between the elastic membrane, and the lid 4 of the top box and of the inflation device 8 is operatively connected to the elastic membrane so as to allow the expansion of the elastic membrane while introducing a gas, preferably air, between the lid 4 and the elastic membrane.

Without prejudice to the principle of the invention, the embodiments and construction details can widely vary with respect to the above description given by way of a mere non-limiting example, without departing from the scope of the invention as defined in the appended claims.

The invention claimed is:

1. A storage container of a motorcycle comprising:
 a container body defining a storage compartment and a lid functionally connected to the container body, wherein said container body comprises an access opening, a bottom wall opposite to the access opening and a side wall which extends perimetrally and is joined to said bottom wall, wherein the lid is operatively connected to the container body to have an open configuration wherein the lid allows access to the storage compartment by said access opening, and a closed configuration wherein the lid closes said access opening, preventing access to said storage compartment,
 wherein said storage container comprises an object blocking system associated with said container body or with said lid and adapted to block an object accommodated in the storage compartment, the object blocking system comprising:
 an inflatable member operatively received in the storage compartment and which has:
 a resting configuration, wherein said inflatable member substantially is deflated and
 an expanded configuration, wherein said inflatable member is expanded with respect to the resting configuration, wherein the inflatable member, in the expanded configuration and when the lid is in the closed configuration, is extended in the storage compartment and blocks said object accommodated in the storage compartment against at least one from among said bottom wall, said side wall and said lid;
 an inflation device operatively connected to the inflatable member to inflate the inflatable member, said inflation device switching the inflatable member from the resting configuration to the expanded configuration;
 a release device operatively connected to the inflatable member to deflate the inflatable member, said release device switching the inflatable member from the expanded configuration to the resting configuration;
 wherein said inflatable member comprises an annular member received in the storage compartment and fastened to the container body.

2. A storage container according to claim 1, wherein said storage container is a top box or a saddlebag of a motorcycle.

3. A storage container according to claim 1, wherein said inflatable member comprises a middle opening inside of which said object is received and retained in said expanded configuration.

4. A storage container according to claim 1, wherein said object blocking system comprises a control system operatively connected to the release device to control the release device by movement of the lid from the closed configuration to the open configuration deflate the inflatable member.

5. A storage container according to claim 1, wherein the inflatable member is fastened to the bottom wall and in said expanded configuration, blocks said object against said lid.

6. A storage container according to claim 1, wherein the inflatable member is fastened to the lid and in said expanded configuration, blocks said object against said bottom wall.

7. A storage container according to claim 1, wherein the inflatable member is fastened to the side wall of the container body and in said expanded configuration, blocks said object against at least one from among the bottom wall, the side wall and the lid.

8. A motorcycle comprising a storage container as defined in claim 1.

* * * * *